No. 662,760. Patented Nov. 27, 1900.
C. H. BOGART.
BOTTLING MACHINE.
(Application filed Jan. 26, 1900.)
(No Model.) 2 Sheets—Sheet 1.
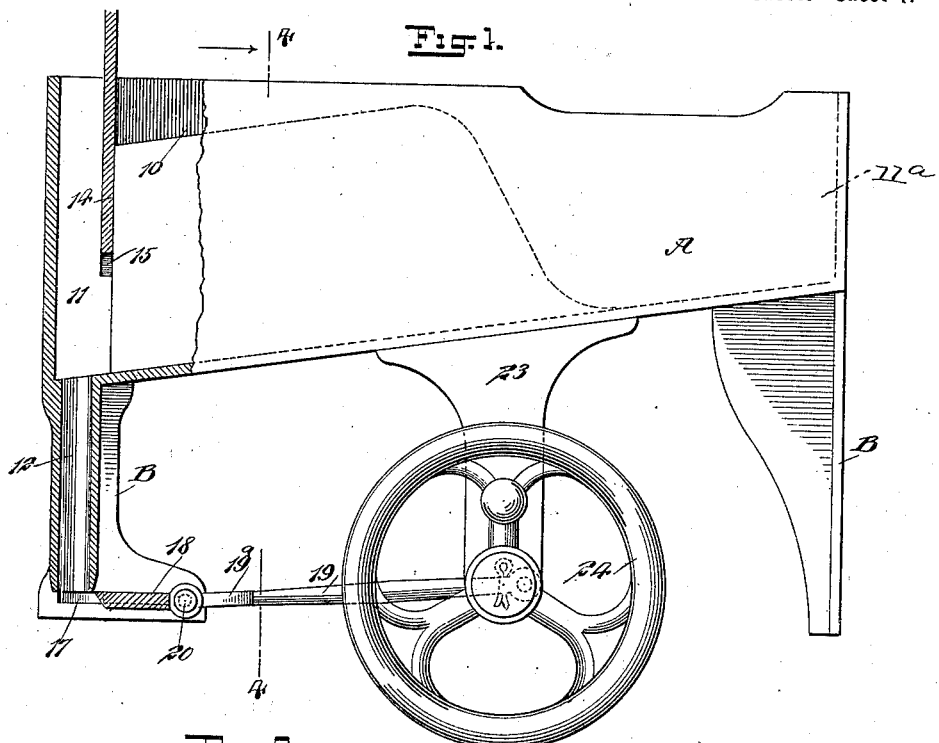
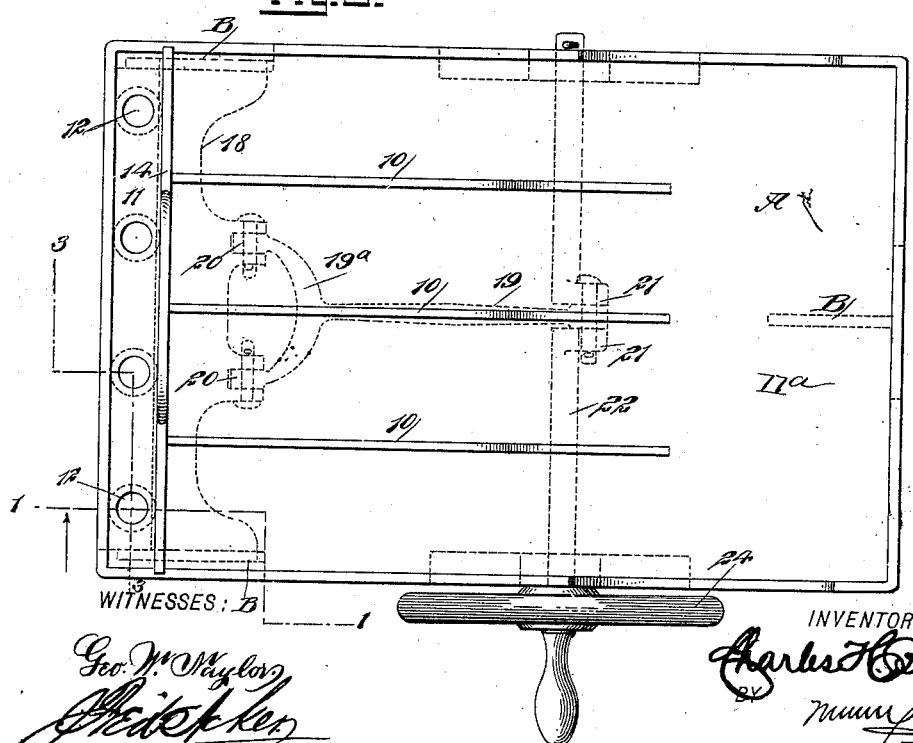
WITNESSES:
INVENTOR
Charles H. Bogart
ATTORNEYS No. 662,760. Patented Nov. 27, 1900.
C. H. BOGART.
BOTTLING MACHINE.
(Application filed Jan. 26, 1900.)

(No Model.) 2 Sheets—Sheet 2.

WITNESSES
INVENTOR
Charles H. Bogart
BY
ATTORNEYS

UNITED STATES PATENT OFFICE.

CHARLES HENRY BOGART, OF NEW YORK, N. Y.

BOTTLING-MACHINE.

SPECIFICATION forming part of Letters Patent No. 662,760, dated November 27, 1900.

Application filed January 26, 1900. Serial No. 2,863. (No model.)

*To all whom it may concern:*

Be it known that I, CHARLES HENRY BOGART, a citizen of the United States, and a resident of the city of New York, borough of Brooklyn, in the county of Kings and State of New York, have invented a new and Improved Bottling-Machine, of which the following is a full, clear, and exact description.

One object of the invention is to provide a bottling-machine especially adapted for bottling milk, either condensed or plain, and to so construct the machine that the milk will be evenly directed to a series of nozzles and the supply regulated before it reaches the nozzles and the delivery ends of the nozzles be simultaneously opened or closed, as desired.

Another object of the invention is to construct a machine of the character described which will be portable, simple, readily manipulated, durable, cleanly, and economic.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 3:
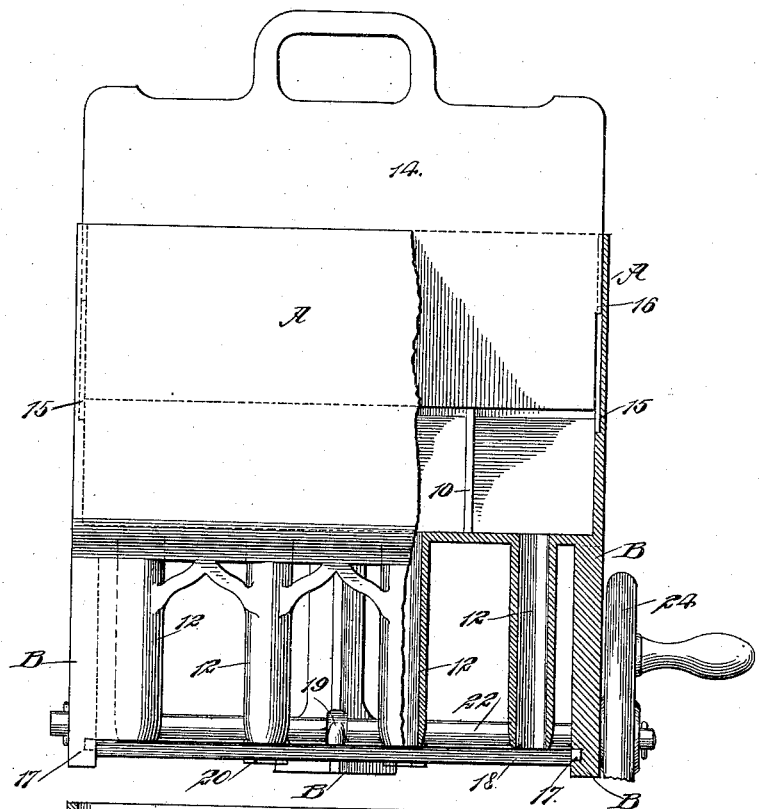
Figure 4:
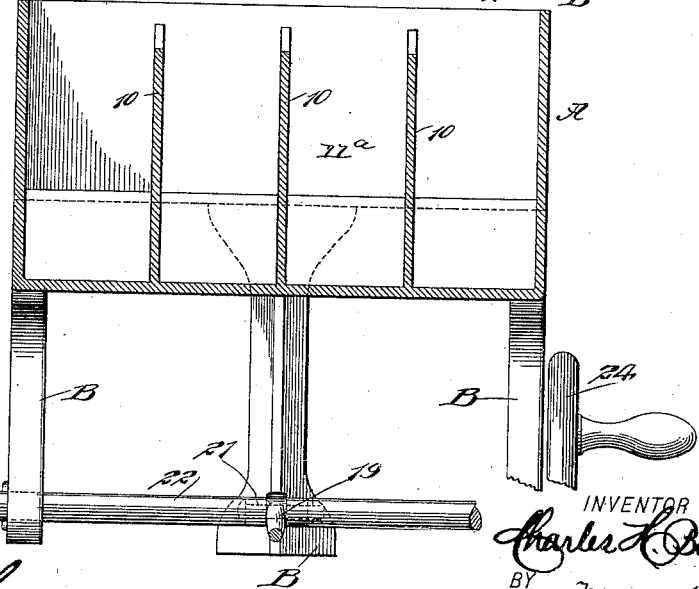

Figure 1 is a partial side elevation and partial vertical section through the machine, the section being taken substantially on the line 1 1 of Fig. 2. Fig. 2 is a plan view of the machine. Fig. 3 is a partial front elevation and a partial vertical section, the section being substantially on the line 3 3 of Fig. 2; and Fig. 4 is a transverse vertical section taken substantially on the line 4 4 of Fig. 1.

The body A of the machine is in the form of a tank, and its bottom is given a downward and a forward inclination, whereby the tank is much deeper at the front than at the rear. This tank is usually supported upon three legs B, a central rear leg and two forward legs, which latter are at each side of the tank. A series of vertical partitions 10 is located within the body or tank A, and these partitions usually extend from a point rearward of the center to a point forward of the center, thus forming in the tank a front vertical chamber 11 and a rear chamber $11^a$, each extending from side to side of the tank.

A series of nozzles 12 is extended downward from the front chamber 11. These nozzles are of equal length and are usually at equal distances apart, and a nozzle 12 is provided for each division in the body or tank A formed by the partitions 10. The milk is placed in the chamber $11^a$ at the upper or rear end of the tank and flows downward to the front, directed by the partitions 10 to the nozzles 12, and in this manner the milk is equally distributed as it flows to the nozzles, and the bottles to be filled are placed at the bottom of the nozzles in any suitable or approved manner. The flow of milk to the nozzles is regulated through the medium of a vertical gate 14, held to slide in the side walls of the front chamber 11 of the tank or body A and in engagement with the forward ends of the partitions 10, as shown in Figs. 1 and 3. Slideways 15 are formed in the side walls of the chamber 11 to receive ribs 16, extending from the ends of the said gate; but the slideways do not extend to the bottom of the chamber 11, since it is very necessary that no projections shall occur in the chamber 11 likely to interfere with the regularity of the flow of the milk. Thus when the gate 14 is closed the lower portion of its ends fit snugly to the inner side faces of the chamber 11. Horizontal slideways 17 are made in the inner faces of the front legs B, extending immediately below the end nozzles 12, and a cut-off 18 in the form of a horizontal slide or gate is mounted to travel in the ways 17, the forward edge of the said slide or gate 18 being given an upward and a forward inclination. A connecting-rod 19 is centrally attached to the horizontal gate or slide 18, preferably through the medium of a yoke $19^a$, having a knuckle connection 20 with the said horizontal gate or slide 18 at each side of its center, as shown in Fig. 2. This connecting-rod 19 at its rear end is pivoted to a crank-arm 21, formed in a transverse shaft 22, journaled in suitable hangers 23, extending downward from the tank or body A, and at one end of the shaft 22 a hand-wheel 24 is secured, whereby the shaft may be rotated and the gate or slide 18 made to simultaneously cut off the supply of milk from all of the nozzles 12 or simultaneously uncover the outlets of the said nozzles partially or entirely.

A machine constructed as above described is particularly adapted for the purpose intended and combines simplicity of construction with strength and cleanliness. Furthermore, all the nozzles are completely under the control of the operator and the supply of milk is evenly directed to each nozzle, and the supply to the nozzles may be regulated as necessity may require.

Having thus described my invention, I claim as new and desire to secure by Letters Patent—

1. The combination of the tank having vertical partitions terminating short of one end of the tank so as to form at one end thereof, a chamber communicating with the series of compartments produced by the partitions, a series of outlets, one in operative relation to each of said compartments, and a gate regulating simultaneously the communication of all the compartments with the chamber.

2. The combination of the tank having an inclined bottom and vertical partitions terminating short of the lower end of the bottom so as to form at the lower end of the tank, a chamber communicating with the series of compartments produced by the partitions, a series of outlets, one in operative relation to each of said compartments, a gate regulating simultaneously the communication of all the compartments with the chamber, and another gate controlling the discharge from the outlets.

3. In a bottling-machine, the combination, with an inclined tank, a series of partitions located within the said tank, terminating short of the deeper end of the tank and forming thereby a vertical chamber, nozzles extending downward from the said chamber, and a slide mounted in the said chamber adjacent to the end of the said partitions, of a gate or slide, a support for the said gate or slide, said gate or slide being common to all of the nozzles and arranged to simultaneously cover or uncover the outlets of the same, a crank-shaft, a connecting-rod pivoted to the crank-arm of the said shaft, having a pivotal connection with the central portion of the gate or slide for the nozzles, and means for rotating the crank-shaft, as set forth.

In testimony whereof I have signed my name to this specification in the presence of two subscribing witnesses.

CHARLES HENRY BOGART.

Witnesses:
   EDWARD A. BURGER,
   SAMUEL LONGMORE.